United States Patent
Paasisalo et al.

(10) Patent No.: US 9,840,398 B2
(45) Date of Patent: Dec. 12, 2017

(54) DIVERTING PULLEY ARRANGEMENT, ELEVATOR, AND METHOD

(71) Applicant: KONE Corporation, Helsinki (FI)

(72) Inventors: Jussi Paasisalo, Riihimäki (FI); Jani Nieminen, Valkeakoski (FI); Jari Österman, Riihimäki (FI); Jukka Penttilä, Hyvinkää (FI); Joni Kiiski, Klaukkala (FI)

(73) Assignee: KONE CORPORATION, Helsinki (FI)

( * ) Notice: Subject to any disclaimer, the term of this patent is extended or adjusted under 35 U.S.C. 154(b) by 307 days.

(21) Appl. No.: 14/230,303

(22) Filed: Mar. 31, 2014

(65) Prior Publication Data

US 2014/0209414 A1 Jul. 31, 2014

Related U.S. Application Data

(63) Continuation of application No. PCT/FI2012/050951, filed on Oct. 4, 2012.

(30) Foreign Application Priority Data

Oct. 25, 2011 (FI) .................................... 20116051

(51) Int. Cl.
*B66B 15/04* (2006.01)
*B66D 3/04* (2006.01)
(Continued)

(52) U.S. Cl.
CPC ................ *B66B 15/04* (2013.01); *B66B 5/02* (2013.01); *B66D 3/04* (2013.01); *F16B 21/16* (2013.01)

(58) Field of Classification Search
CPC .... B66B 1/26; B66B 5/02; B66B 5/04; B66B 5/044; B66B 5/06; B66B 5/16;
(Continued)

(56) References Cited

U.S. PATENT DOCUMENTS 1,070,834 A * 8/1913 Nissen ................... B66D 3/046
254/406
4,662,481 A * 5/1987 Morris ................... B66B 5/044
187/373
(Continued)

FOREIGN PATENT DOCUMENTS

CN 101891095 A 11/2010
CN 201746192 U 2/2011
(Continued)

OTHER PUBLICATIONS

CN101891095 English Translation.*

*Primary Examiner* — Minh Truong
(74) *Attorney, Agent, or Firm* — Birch, Stewart, Kolasch & Birch, LLP

(57) ABSTRACT

Diverting pulley arrangement, more particularly a diverting pulley arrangement of an elevator, which arrangement includes an axle, at least one diverting pulley that rotates while supported on the axle, a faceplate structure, in relation to which and supported by which the diverting pulley is arranged to rotate on the first side of the faceplate structure, which axle is locked so that it does not rotate by the aid of a locking element that moves in relation to the faceplate structure, which locking element is on the second side of the faceplate structure. When it starts to rotate, the end of the axle forces the locking element to displace out of its position and to trip a safety switch.

13 Claims, 4 Drawing Sheets

Figure 1C:
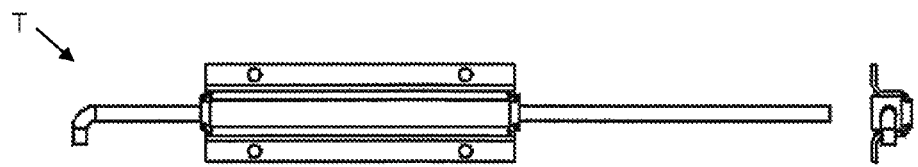
Figure 1C:
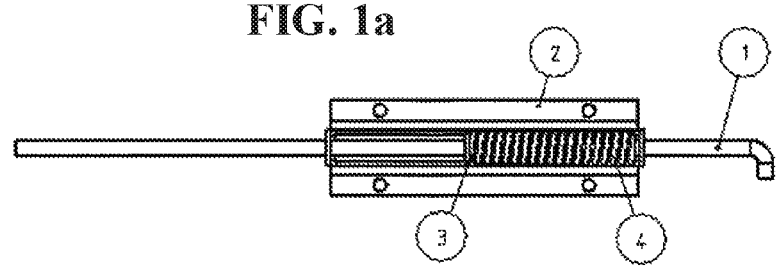

(51) Int. Cl.
*B66B 5/02* (2006.01)
*F16B 21/16* (2006.01)

(58) Field of Classification Search
CPC ......... B66B 5/20; B66B 15/02; B66B 15/042;
B66B 15/04; B66B 15/42; B66D 3/04;
B66D 3/046; B66D 3/26; B66D 5/06;
F16B 21/09; F16B 21/16
See application file for complete search history.

(56) References Cited

U.S. PATENT DOCUMENTS

| | | | |
|---|---|---|---|
| 6,345,696 B1 * | 2/2002 | Yumura | B66B 5/06 187/287 |
| 8,181,749 B2 * | 5/2012 | Okada | B66B 5/044 187/287 |
| 9,010,497 B2 * | 4/2015 | Saarelainen | B66B 15/02 187/262 |
| 2011/0308892 A1 | 12/2011 | Saarelainen et al. | |
| 2013/0098711 A1 * | 4/2013 | Aguado | B66B 5/044 187/373 |
| 2015/0144433 A1 * | 5/2015 | Koivukangas | B66B 19/007 187/266 |
| 2015/0158703 A1 * | 6/2015 | Moser | B66B 15/02 187/266 |

FOREIGN PATENT DOCUMENTS

| | | |
|---|---|---|
| CN | 102341335 A | 2/2012 |
| EP | 0616140 A2 | 9/1994 |
| WO | WO 98/29326 A1 | 7/1998 |
| WO | WO 2010/103165 A1 | 9/2010 |

* cited by examiner

FIG. 1a  FIG. 1b

DIVERTING PULLEY ARRANGEMENT, ELEVATOR, AND METHOD

CROSS REFERENCE TO RELATED APPLICATIONS

This application is a Bypass Continuation of PCT International Application No. PCT/FI2012/050951 filed on Oct. 4, 2012, which claims priority under 35 U.S.C §119(a) to Patent Application No. 20116051 filed in Finland on Oct. 25, 2011, all of which are hereby expressly incorporated by reference into the present application.

FIELD OF THE INVENTION

The object of the invention is a diverting pulley arrangement, an elevator, and a method for determining the condition of a bearing of a diverting pulley.

BACKGROUND OF THE INVENTION

In prior-art diverting pulleys the axle of the diverting pulley is locked into position with a locking plate that extends into a groove made in the axle. The groove is milled into the axle from the transverse direction, in which case the groove comprises a detent surface facing the transverse direction of the axle, against which the locking plate is placed.

A problem in these prior-art solutions is that since the groove is milled in the solutions at a distance from the butt end of the axle, the detent surface that is against the locking plate remains hidden behind the butt end of the axle. That being the case, it is not possible to visually inspect the contact point of the locking plate and the detent surface of the axle. Inspecting this point is necessary so that the condition of the locking plate, and indirectly also the condition of the bearings, can be determined.

If servicing intervals are long, the condition of bearings can deteriorate over time so that a diverting pulley rotating on an axle starts essentially to try to rotate the axle. When the axle tries to rotate, the pressure exerted on the locking plate by the detent surface and also the wear resulting from to-and-from loading increase. Verifying the condition of the locking plate is laborious in prior art, because the diverting pulley structure has to be opened for this purpose.

The condition of the bearing of the diverting pulley moving along with the counterweight of the elevator is almost impossible to estimate in advance and therefore the probable failure time of the bearing is undeterminable. Only minor noise, heat and vibration results from a bearing failure, so that noise, heat or vibration are not suited as a cost-effective indicator of a bearing defect.

The chief maintenance function for the bearing of a diverting pulley of a counterweight of an elevator is visual and observations in the elevator hoistway based on sound. Failure of a bearing of a diverting pulley of a counterweight of an elevator might result in structural damage in the counterweight, freefall of the counterweight and gripping of the elevator car.

AIM OF THE INVENTION

The aim of the invention is to eliminate, inter alia, the aforementioned drawbacks of prior-art solutions. More particularly the aim of the invention is to produce a diverting pulley arrangement, elevator and method that are improved from the standpoint of maintenance. The aim of the invention is further to produce one or more of the following advantages, among others:

A solution is achieved with which servicing procedures can be speeded up and made more efficient.

A solution is achieved in which the condition and possible wearing of the locking element of the diverting pulley are more quickly detected than earlier.

A solution is achieved in which deterioration of the condition of the bearings of the diverting pulley is more quickly detected than earlier.

A solution is achieved in which the condition of the diverting pulley can be visually observed better than earlier.

A solution is achieved in which the condition of the bearings of a diverting pulley can be visually observed during normal operation better than earlier from a moving diverting pulley, preferably e.g. from a diverting pulley of a counterweight of an elevator.

A solution is achieved that enables the use of different sensor solutions in connection with the safety circuit of an elevator.

A solution is achieved that enables the use of different sensor solutions for stopping an elevator as a consequence of failure of a diverting pulley.

SUMMARY OF THE INVENTION

The diverting pulley arrangement according to the invention of a counterweight, the elevator according to the invention and the method according to the invention are characterized by what is disclosed in the independent claims. Other embodiments of the invention are characterized by what is disclosed in the other claims. Some inventive embodiments are also presented in the descriptive section and in the drawings of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments of the invention can be applied within the scope of the basic inventive concept in conjunction with other embodiments.

The diverting pulley arrangement according to the invention, which is more particularly a diverting pulley arrangement of an elevator, comprises an axle, at least one diverting pulley that rotates while supported on the axle, a faceplate structure, in relation to which and supported by which the diverting pulley is arranged to rotate on the first side of the faceplate structure, which axle is locked so that it does not rotate in relation to the faceplate structure by the aid of a locking element, which locking element is on the second side of the faceplate structure and supported so that it moves in relation to the faceplate structure. The locking element is placed against the locking surface comprised in the axle so that the contact point of the locking element and the locking surface of the axle is at least partly visible, preferably in particular when viewed from the direction of the butt end of the axle. In this way it is possible for the contact point to be inspected from the direction of the butt end of the axle, and the locking element does not need to be detached for this purpose.

In one embodiment of the invention the contact point of the locking surface and of the locking element being against each other is at least partly visible, preferably for its whole length, when viewed from the direction A of the second butt end of the axle, more particularly without the parts of the axle impairing the visibility of the contact point.

In one embodiment of the invention, the arrangement comprises locking means for locking the axle so that it does not rotate, and also positioning means for positioning the axle in relation to the faceplate structure in the axial direction, such as e.g. a positioning groove circling around the axle, and a second locking element, which locking means and positioning means are separate to each other. One advantage is that when the locking element fails the axle the axle remains in its position to rotate.

In one embodiment of the invention, the axle comprises a locking indent in its end that extends to the second side of the faceplate structure, into which locking indent the aforementioned locking element that moves in relation to the faceplate structure is placed to prevent rotation of the axle, and that the locking indent opens both in the longitudinal direction and in the transverse direction of the axle, and that the locking surface of the indent, which faces in the transverse direction of the axle, forms a detent surface for the locking element for preventing rotation of the axle.

In one embodiment of the invention, the aforementioned locking element in relation to the faceplate structure is placed to prevent rotation of the axle, and the aforementioned locking element is movably fixed in its position using fixing elements, such as e.g. screws and/or nuts to be tightened with threads to a torque.

In one embodiment of the invention, the purpose of the moving locking element is to ensure that the axle stays in its position in relation to the faceplates of the diverting pulley pack in normal situations of the elevator and to prevent rotation of the axle when the bearings of the diverting pulley are in operable condition.

In one embodiment of the invention, the end of the axle is shaped such that when it starts to rotate it forces the locking element to displace out of its position and to trip a safety switch. The operating principle of the safety switch is based on this displacement of the locking element. The safety switch, to be connected to a safety circuit, of the diverting pulley enables a keyhole structure of the axle of the diverting pulley and the faceplates, supplemented with a moving locking element, such as with a sliding axle latch.

In one embodiment of the invention the condition of the bearings is determined during normal operation from a moving diverting pulley, preferably e.g. from the diverting pulley of a counterweight of an elevator.

According to the invention, in the method for determining the condition of a bearing of a diverting pulley comprised in a diverting pulley arrangement, preferably a diverting pulley arrangement of an elevator, a switch of the safety circuit trips if excess friction occurs in the bearings of the diverting pulley.

The method is advantageous for the reason, among others, that the locking element offers to maintenance a visual observation of a bearing defect.

The method is also advantageous for the reason, among others, that the locking element prevents savage loading of a moving counterweight structure resulting from shearing of the bearing of the diverting pulley of the counterweight.

The method is also advantageous for the reason, among others, that the locking element enables the use of different sensor solutions for stopping an elevator.

LIST OF FIGURES

In the following, the invention will be described in detail by the aid of some embodiments with reference to the attached drawings, wherein FIGS. 1a-1c present assembly views of a safety switch of a diverting pulley arrangement according to one embodiment of the invention.

Figure 2:
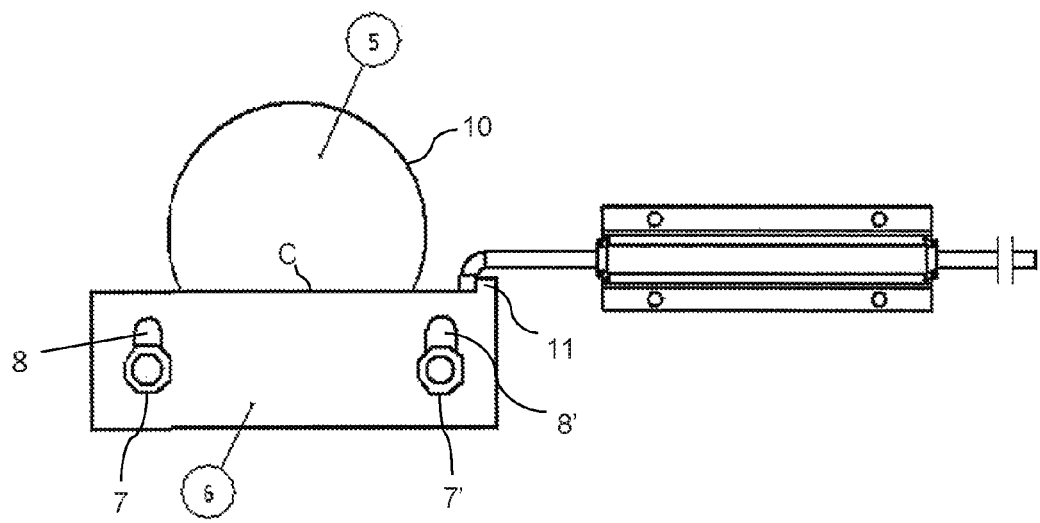

FIG. 2 presents a moving locking element, with safety switch, of a diverting pulley arrangement according to one embodiment of the invention.

Figure 3:
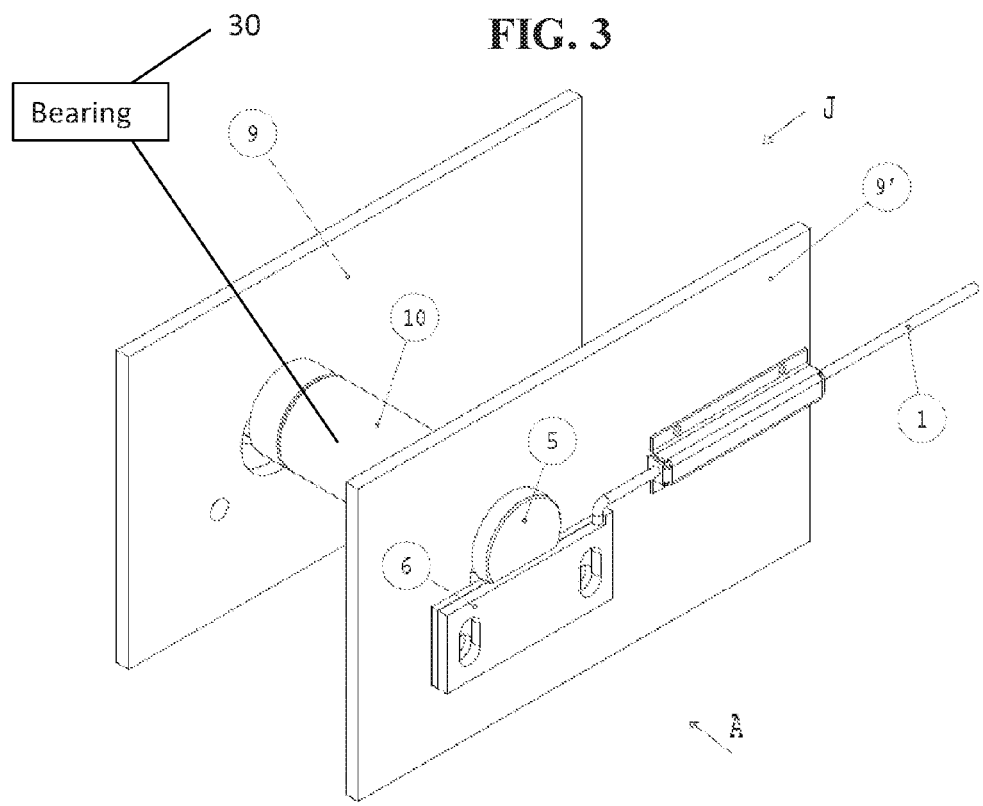
Figure 4:
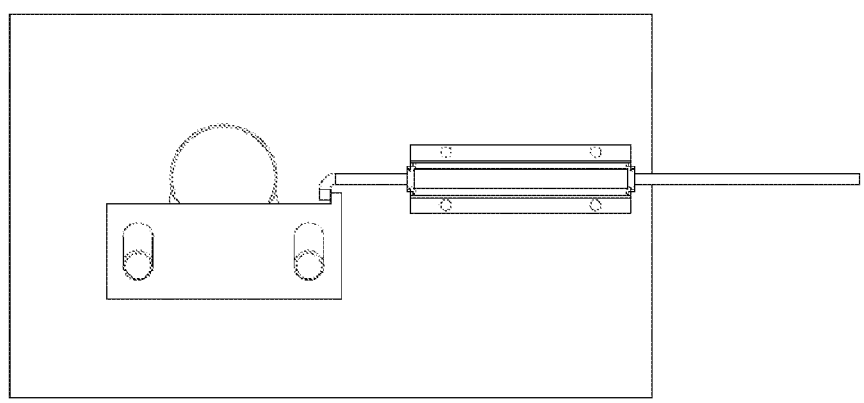

FIG. 3 presents a three-dimensional view of a diverting pulley arrangement according to one embodiment of the invention when the safety switch is cocked in its normal position FIG. 4 presents a diverting pulley arrangement according to FIG. 3 when the safety switch is cocked in its normal position, as viewed from the direction A of the second butt end of the axle.

Figure 5:
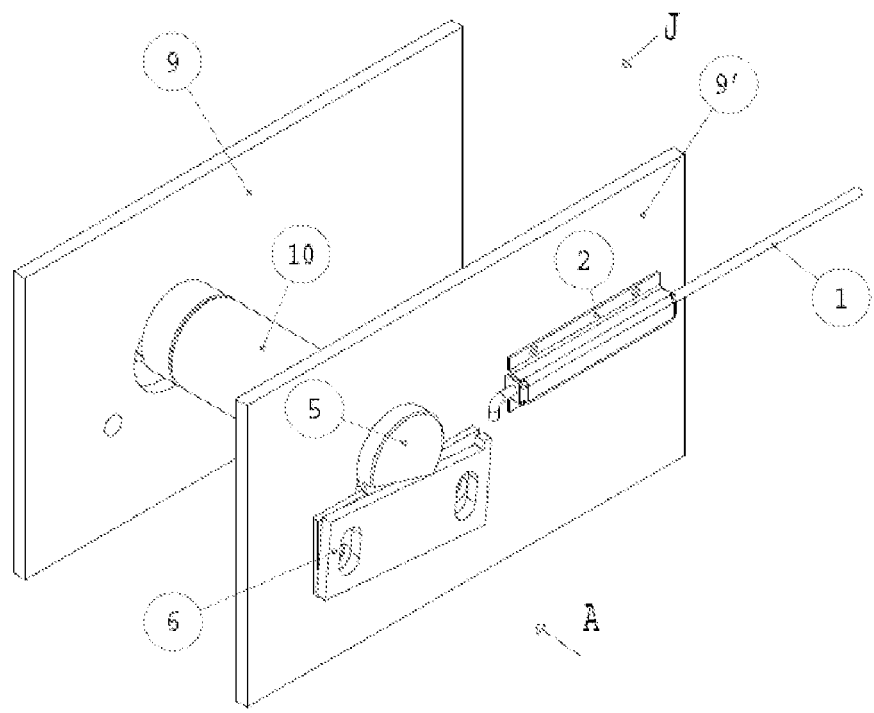

FIG. 5 presents a three-dimensional view of a diverting pulley arrangement according to one embodiment of the invention when the safety switch has tripped along with the rotation of the axle.

Figure 6:
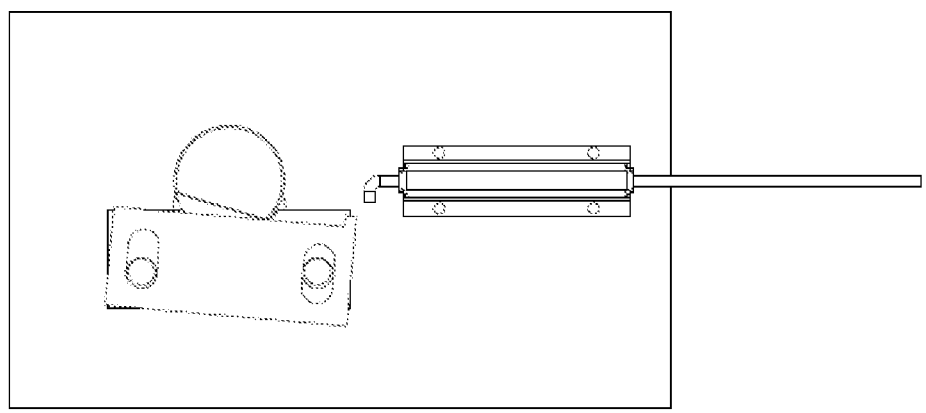

FIG. 6 presents a diverting pulley arrangement according to FIG. 5 when the safety switch has tripped along with the rotation of the axle, as viewed from the direction A of the second butt end of the axle.

Figures 7A, 7B:
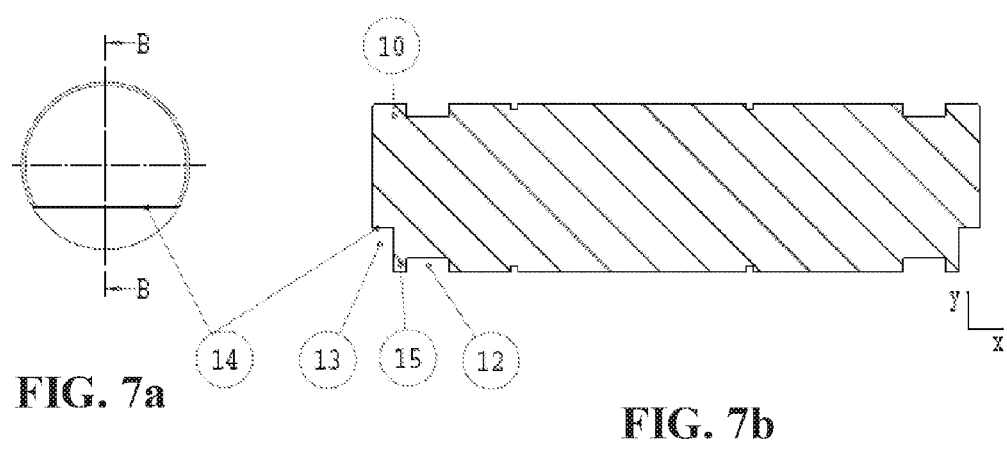

FIG. 7a presents an end view of an axle according to one embodiment of the invention for use in a diverting pulley arrangement according to the invention; FIG. 7b presents a cross-sectional view taken along line B-B in FIG. 7a.

DETAILED DESCRIPTION OF THE INVENTION

FIGS. 1a-1c present assembly views of a safety switch T according to one embodiment of the diverting pulley arrangement, which safety switch comprises a cat whisker 1, a casing 2, a retainer part 3 on the stem of the cat whisker 1, the purpose of said retainer part being to keep the spring 4 in its preset position inside the casing. The spring 4 inside the casing 2 of the safety switch compresses as a consequence of the cocked state and when it is released expands to its full length.

FIG. 2 presents a safety switch arrangement according to one embodiment of the diverting pulley arrangement, which safety switch arrangement comprises the safety switch T presented in FIG. 1a, an axle 10 of a diverting pulley, which axle 10 is locked so that it does not rotate in relation to the faceplate structure of the diverting pulley by the aid of a locking element 6. The locking element 6 is placed against the detent surface comprised in the axle 10 so that the contact point C of the locking element 6 and the detent surface of the axle 10 is at least partly visible, preferably however visible for its whole length, when viewed from the direction A of the butt end 5 of the axle. This is brought about by shaping/arranging the parts of the arrangement so that the parts of the axle 10 do not prevent the contact point C being visible in the direction of the butt end 5 of the axle. The locking element 6 is movably fixed to the faceplate structure 9, 9' via fixing elements 7, 7', which fixing elements 7, 7' are preferably screws and/or nuts to be tightened with threads to a torque. The locking element 6 is preferably a plate, the surface of which is essentially flush with the butt end surface 5 of the axle 10, and in which locking element 6 apertures 8, 8' enabling movement are arranged for the fixing elements 7, 7'. A notch 11 is arranged on end of the moving locking element 6, on the safety switch T side of it, which notch is preferably a part of the aforementioned plate 6, and which essentially rises to above the lateral edge of the aforementioned plate 6 such that the notch 11 functions as a detent surface for the claw of the cat whisker 1 of the safety switch T.

FIG. 3 presents a three-dimensional view of a diverting pulley arrangement according to one embodiment, when the safety switch is cocked in its normal position, which diverting pulley arrangement comprises an axle 10, at least one diverting pulley (not presented in the figure) rotating, preferably around the axle, while supported on the axle, a faceplate structure 9, 9', which preferably comprises at least one faceplate, in relation to which and supported by which faceplate structure 9, 9' the diverting pulley is arranged to rotate while supported by the axle 10 on the first side of the faceplate structure. When the moving locking element 6 is in its normal position, the safety switch T is cocked. The spring 4 inside the casing 2 of the safety switch T is compressed as a consequence of the cocked state. The axle 10 is locked so that it does not rotate by the aid of a locking element 6 that moves in relation to the faceplate structure 9, 9', which locking element 6 is on the second side of the faceplate structure 9, 9', which second side is on the opposite side to the first side, and supported so that it moves in relation to the faceplate structure 9, 9'. The locking element 6 is placed against the detent surface comprised in the axle 10 so that the contact point C of the moving locking element 6 and the detent surface of the axle 10 is at least partly visible, preferably however visible for its whole length, when viewed from the direction A of the butt end 5 of the axle. This is brought about by shaping/arranging the parts of the arrangement so that the parts of the axle 10 do not prevent the contact point C being visible in the direction of the butt end 5 of the axle. The locking element 6 is movably fixed to the faceplate structure 9, 9' via fixing elements 7, 7'. The locking element 6 is preferably a plate, the surface of which is essentially flush with the butt end surface 5 of the axle 10. Thus the contact point C is easily visible when viewed from the direction A of the butt end of the axle because the edge side, on the side of the second butt end of the axle, of the surface of the moving locking element 6 that is against the axle 10 is very visible. Likewise the edge side, on the side of the second butt end of the axle of the surface that is against the moving locking element 6, of the detent surface of the second butt end of the axle is very visible. The diverting pulley arrangement J preferably, but not necessarily, comprises a bearing 30 between the axle and the diverting pulley. If the bearing starts to fail, the axle presses against the moving locking element 6 and wear of the bearing is first visible as a displacement of the locking element 6 out of its position, until after the locking element 6 has been displaced from its position sufficiently the safety switch T trips and disconnects the safety circuit, stopping the elevator.

FIG. 4 presents a diverting pulley arrangement according to FIG. 3 when the safety switch is cocked in its normal position, as viewed from the direction A of the butt end 5 of the axle. For achieving the cocked state, the cat whisker 1 of the safety switch is locked into position owing to the shape of the notch 11 of the moving locking element 6 and the shape of the claw of the cat whisker 1.

FIG. 5 presents a three-dimensional view of a diverting pulley arrangement according to one embodiment when the safety switch has tripped, in which safety switch arrangement when the moving locking element 6 displaces out of its position along with rotation of the axle 10, the safety switch T trips. When the cat whisker 1 is released from its position as the locking element 6 displaces downwards, the compressed spring 4 expands to its full length. As a consequence of this a lateral movement of the cat whisker 1 occurs, because the retainer part 3 receives the thrusting force produced by the spring 4. The outer end of the cat whisker 1 displaces to the side to be closer to the guide rails (not presented in the figures) of the elevator, preferably the guide rails of the counterweight of the elevator. A limit switch (not presented in the figures) is fixed to one or more guide rails of the elevator, when passing which limit switch the cat whisker 1 causes movement of the contact of the limit switch, and the safety circuit disconnects and the elevator stops.

FIG. 6 presents a diverting pulley arrangement according to FIG. 5 when the safety switch has tripped, as viewed from the direction A of the butt end 5 of the axle.

FIG. 7a presents an axle 10 according to one embodiment of the diverting pulley arrangement viewed from the direction A, and FIG. 7b is a cross-sectional drawing (section B-B). The axle 10 comprises a locking indent 13 in its end that extends to the second side of the faceplate structure 9, 9', into which locking indent 13 the aforementioned locking element 6 that is movably fixed in relation to the faceplate is intended to be placed to prevent rotation of the axle 10. The locking indent 13 opens both in the longitudinal direction x and in the transverse direction y of the axle, and the surface 14 of the indent 13, which surface faces in the transverse direction y of the axle 10, forms a detent surface used for locking for the locking element 6 to prevent rotation of the axle 10. The axle 10 comprises a positioning recess 12 for positioning the axle 10 in relation to the faceplate structure 9, 9' in the axial direction x, such as e.g. a positioning groove 12 circling around the axle. The locking surface 14 placed against the moving locking element 6 is separate from the positioning recess 12, separated by a neck 15. The arrangement comprises means (not presented in the figure), separate from the locking means that prevent rotation, for positioning the axle 10 in the axial direction. That being the case when the moving locking element 6 wears and possibly when it detaches, the axle starts to rotate supported on the faceplate positioned by separate positioning means, which improves the safety of the arrangement. The positioning means and the locking means being separate from each other can form a separate invention that is independent of the rest of the construction of the diverting pulley arrangement.

The faceplate structure comprises a first faceplate 9 and a second faceplate 9', which are fixed to each other with fixing means. The locking element 6 is movably fixed to the faceplate structure 9, 9' with fixing means 7, 7', which are illustrated in simplified form in the drawings, and which fixing means preferably comprise at least one screw or nut to be tightened with threads to a torque. The diverting pulley arrangement J can be supported in its installation position e.g. via the faceplate. The faceplate structure 9, 9' comprises an aperture, through which the end 5 of the axle 10 extends to the second side of the faceplate structure 9, 9', and the faceplate structure 9, 9' extends into the positioning groove 12 of the axle 10. The aperture is formed to comprise a wider section, from which the axle 10 can be pushed through, and a narrower section, to the point of which the axle 10 pushed through from the aperture can be displaced in the direction of the plane of rotation of the axle from the point of the wider aperture, and when the axle 10 is at the point of the narrower section the faceplate structure 9, 9' extends into the positioning groove 12 and prevents movement of the axle 10 in the longitudinal direction x. When the axle 10 is positioned by means of the locking groove 12, the locking element 6 prevents displacement of the axle 10 in the radial direction of the axle out of the position that is positioned by means of the locking groove 12.

The indent 13 opens in the longitudinal direction x and in the transverse direction y, as presented above. The indent in this case comprises a surface that faces essentially in the transverse direction y, but preferably the surface 14 faces directly in the transverse direction y when the direction y is at a right angle to the longitudinal direction of the axle, which is the direction of the rotational axis of the axle. The indent opens in addition to this in the longitudinal direction x, preferably but not necessarily for its whole length. The locking surface of the indent that opens in the longitudinal direction x directly faces most preferably in the transverse direction x, in which case formation of support forces in the axial direction is avoided, but the locking surface could alternatively also be slightly inclined in the direction of the butt end 5. With these arrangements, since the indent 13 opens in the direction y, when placing the moving locking element 6 into the indent the contact point C of the moving locking element 6 and the locking surface 14 is visible from the direction A of the butt end 5 of the axle 10 without the parts of the axle 10 blocking visibility.

The locking element 6 is preferably a plate, preferably a rectangular polyhedron, one straight edge side of which forms a surface to be placed against the detent surface of the axle. The indent 13 extends preferably from flush with the butt end 5 of the axle 3-10 mm, most preferably 3-7 mm, in the longitudinal direction of the axle. The indent in the butt end 5 opening in the longitudinal direction is preferably a cavity milled in the axle 10, which is preferably round in its cross-section. There can be a plurality of diverting pulleys supported on the axle, in which case the diverting pulleys of the diverting pulley plurality can each have separate bearings or can have common bearings.

The contact point C between the axle and the locking element can be arranged to remain visible in other ways than by making an indent that opens in the longitudinal and transverse directions of the axle. The end of the axle can e.g. be formed to comprise a projection that protrudes from the axle in its radial direction, which projection comprises a detent surface facing in essentially the tangential transverse direction of the axle, against which surface the locking element can be placed.

The rope attempts to rotate the diverting pulley with the frictional force Fu between them. When the condition of the bearings is weak, the force from movement of the rope is transmitted to the moving locking element 6. The locking element 6 is preferably dimensioned to slip before slipping between the diverting pulley and the rope guided by the diverting pulley starts to occur. Preferably the locking element is dimensioned to move when the rope exerts on the diverting pulley 40-60%, more preferably approx. 50%, of the force at which slipping would start. The fixing means 7, 7' in the figures are preferably normal fixing means in the parts of the diverting pulley, such as screws and/or nuts to be tightened with threads to a torque.

In the method according to the invention for determining the condition of a bearing comprised in a diverting pulley arrangement J of an elevator, e.g. a passenger elevator, the condition of the bearing is determined on the basis of the position of the moving locking element 6, preferably a sliding axle latch, which moving locking element 6 locks the axle 10 so that it does not rotate in relation to the faceplate structure 9, 9' of the diverting pulley arrangement J. The condition of the bearing is determined by inspecting from the direction A of the second butt end 5 of the axle 10 that the locking surface 14 of the axle 10 and the moving locking element 16 are against each other on the basis of the position of the contact point C. In the method the elevator and/or diverting pulley arrangement J is preferably one presented somewhere else in this application, e.g. in FIGS. 1-7. If a change in the position of the moving locking element 6 is observed before tripping of the safety switch, a need to replace the bearing of the axle is diagnosed. The method is advantageous for the reason, among others, that the condition of the bearings can be determined also during normal operation from a moving diverting pulley, e.g. from the diverting pulley of the counterweight. Determining the bearing condition on e.g. the aural principle would be impossible.

For the sake of clarity, neither the bearing nor the diverting pulley is presented in the figures. The bearing is preferably any prior-art bearing, in which case the bearing, e.g. ball bearings, is around the axle 10 and the diverting pulley structure is on the rim of the bearing. The bearing can be on the axle in a fixed or rotating manner, however preferably so that it enables rotation between the axle 10 and the diverting pulley.

The elevator according to the invention is e.g. a passenger elevator, which comprises an elevator car, roping, which moves when the elevator is operated, such as e.g. hoisting roping and/or compensating roping, and a diverting pulley arrangement J, which diverting pulley arrangement J comprises at least one diverting pulley arranged to rotate in the elevator hoistway and/or on the elevator car and/or on the counterweight, which diverting pulley is arranged to guide the passage of at least one rope or corresponding comprised in the aforesaid roping.

It is obvious to the person skilled in the art that the invention is not limited to the embodiments described above, in which the invention is described using examples, but that many adaptations and different embodiments of the invention are possible within the frameworks of the inventive concept defined by the claims presented below. Thus, for example, it is obvious that although the structure of only one butt end of the axle is described above, it is clear that both ends of the axle can comprise functions and/or structures that are similar to those described above. Likewise, the faceplate structure can be similar in its functions and/or structures on both sides of the diverting pulley/diverting pulley plurality supported by the axle.

The invention claimed is:

1. A diverting pulley arrangement, comprising:
   an axle, having a locking surface;
   at least one diverting pulley that rotates while supported on the axle;
   a faceplate structure, the diverting pulley being supported by the faceplate structure and being operable to rotate on a first side of the faceplate structure, a distal end of the axle extending to a second side, opposite to the first side, of the faceplate structure;
   a safety switch, comprising:
      a cat whisker,
      a casing,
      a spring and
      a retainer part on a stem of the cat whisker, and configured to keep the spring in a preset position inside the casing; and
   a locking element provided on the second side of the faceplate structure, and movable with respect to the faceplate structure, the locking element being configured to lock the axle by preventing the axle from rotating, wherein the locking element, on a side thereof facing the safety switch, includes a detent surface engagable with an inner end of the cat whisker,
wherein the locking element includes:
- a first operational position where the locking element is placed against the locking surface of the axle so that a contact point of the locking element and the locking surface of the axle is at least partly visible when viewed from a direction of the distal end of the axle, and the inner end of the cat whisker engages the detent surface of the locking element, and
- a second operational position where when the axle starts to rotate, the distal end of the axle forces the locking element to displace out of the first operational position and to trip the safety switch by disengaging the inner end of the cat whisker from the locking element such that an outer end of the cat whisker displaces to a side away from the locking element and disconnects a safety circuit of the elevator, wherein said distal end of the axle comprises a locking indent configured to engage with the locking element to prevent rotation of the axle, the locking indent is recessed from a distal end surface of said distal end in a longitudinal direction (x) and extends to a circumference of the axle in a transverse direction (y) of the axle, and the locking indent includes the locking surface orthogonal to the distal end surface, and wherein the axle includes a positioning groove for positioning the axle in relation to the faceplate structure in the longitudinal direction (x), and the locking indent and the positioning groove are separate from each other in the longitudinal direction (x) by a neck structure having an outer radial diameter different from the positioning groove.

2. The diverting pulley arrangement according to claim 1, wherein the contact point extends for a whole length of the locking surface and is visible, when viewed from the direction of the distal end of the axle.

3. The diverting pulley arrangement according to claim 1, wherein the cat whisker is locked into position by aid of the locking element and a claw of the cat whisker for achieving a cocked state in the first operational position.

4. The diverting pulley arrangement according to claim 1, further comprising a bearing between the axle and the diverting pulley.

5. The diverting pulley arrangement according to claim 1, wherein the locking element is a plate, and a surface of the plate is essentially flush with the distal end surface of the distal end of the axle.

6. The diverting pulley arrangement according to claim 1, wherein the locking element is movably fixed to the faceplate structure via at least one fixing element.

7. The diverting pulley arrangement according to claim 1, wherein the positioning groove circles around the axle for positioning the axle in relation to the faceplate structure in the axial direction (x).

8. The diverting pulley arrangement according to claim 1, wherein the faceplate structure comprises an aperture, through which the distal end of the axle extends to the second side of the faceplate structure, and an edge structure of the aperture extends into the positioning groove of the axle, for preventing movement of the axle in at least one of the longitudinal direction (x) and the transverse direction (y) of the axle.

9. The diverting pulley arrangement according to claim 8, wherein the aperture is formed with a wider section and a narrow section, and the aperture is configured in such a manner that the axle can be pushed through the wider section, and pushed into the narrower section from the wider section in the transverse (y) direction, and wherein when the axle is pushed into the narrower section, the faceplate structure extends into the positioning groove and prevents movement of the axle in the longitudinal direction (x).

10. The diverting pulley arrangement according to claim 1, wherein the locking indent has a depth, in the transverse direction (y) of the axle, greater than a depth, in the transverse direction (y) of the axle, of the positioning groove.

11. An elevator, comprising:
- an elevator car;
- a roping, which moves when the elevator is operated; and
- the diverting pulley arrangement according to claim 1,
  wherein the diverting pulley arrangement comprises at least one diverting pulley arranged to rotate in at least one of an elevator hoistway, the elevator car and a counterweight, and the diverting pulley is arranged to guide passage of the roping.

12. A method for determining condition of a bearing of a diverting pulley comprised in the diverting pulley arrangement according to claim 1, wherein the condition of the bearing is determined on the basis of a position of the locking element or the locking surface of the axle, wherein the locking element is placed by means of fixing elements against the locking surface of the axle and locks the axle by preventing the axle from rotating in relation to the faceplate structure of the diverting pulley arrangement.

13. The method according to claim 12, wherein the condition of the bearing is determined by means of the safety switch, wherein when the axle starts to rotate, the distal end of the axle forces the locking element to displace out of the first operational position and to trip the safety switch.

* * * * *